UNITED STATES PATENT OFFICE.

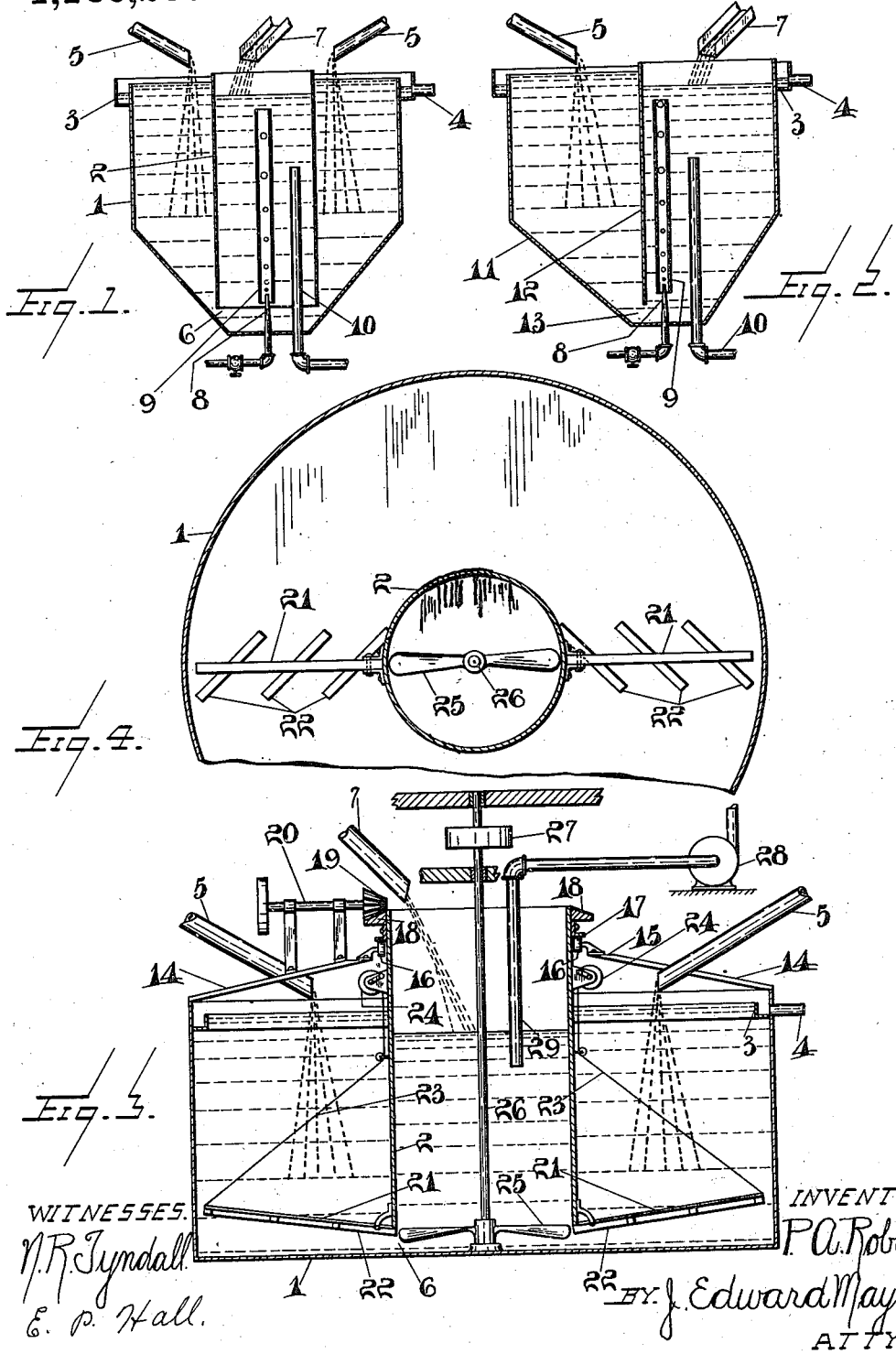

PERCY A. ROBBINS, OF TIMMINS, ONTARIO, CANADA.

APPARATUS FOR LEACHING ORES AND THE LIKE.

1,160,200.   Specification of Letters Patent.   Patented Nov. 16, 1915.

Application filed August 19, 1914. Serial No. 857,534.

*To all whom it may concern:*

Be it known that I, PERCY A. ROBBINS, of the town of Timmins, in the Province of Ontario, Canada, a citizen of the United States of America, have made certain new and useful Improvements in Apparatus for Leaching Ores and the like, of which the following is a specification.

In carrying out certain chemical processes, and particularly in metallurgical work it is frequently necessary to first treat a pulped solid with one solution, then to separate the pulp from the solution and to mix it with a second solution.

In order to avoid expense and to maintain a large output it is necessary that the separation and subsequent mixing should be effected as rapidly as possible and that the separation should be as complete as is possible without unduly reducing the speed of output.

I attain my object by employing a settling tank and a mixing tank one within the other and in communication at their lower ends.

The mixed pulp and first solutions are fed into the settling tank. The larger part of the solution flows out at the top and the pulp with a proportion of solution passes in a constant flow into the mixing tank where it is mixed with the second solution and the mixture constantly withdrawn.

Means are provided for facilitating the flow of pulp from the settling chamber to the mixing chamber.

The invention is illustrated in the accompanying drawings in which—

Figure 1 is a vertical section of one form of my apparatus; Fig. 2 a similar view of a modification; Fig. 3 a similar view of a preferred form of the apparatus; and Fig. 4 a plan view of the same.

In the drawings like numerals of reference indicate corresponding parts in the different figures.

In its simplest form my invention is arranged as shown in Figs. 1 and 2. In Fig. 1, 1 is a tank having its bottom formed as a truncated cone, 2 is a tank preferably cylindrical and arranged centrally within the outer tank which is also preferably cylindrical. The two tanks are preferably of substantially the same effective height so that the head of liquid in each tank may be maintained substantially the same. The outer tank is provided with the annular launder 3 into which it may overflow, the launder being provided with the spout 4. Into the outer tank leads one or more spouts 5 which are adapted to feed a mixture of pulped ore and solution into the tank. The tank 2 does not extend entirely to the bottom of the outer tank so that an annular opening 6 of large area is formed between the two. The mixture of pulp and solution fed into the outer tank begins to separate by gravity, the clear solution overflowing the edge of the tank into the launder. Particles of pulp settle out of the solution and move to the bottom of the tank being guided by the sloping bottom to the opening 6 through which opening the pulp particles enter the tank 2. This opening being of large capacity the rate of travel of the pulp is comparatively slow giving ample opportunity for the proper separation of the pulp from the clear solution in the tank 1. The second liquid or solution for mixing with the pulp is fed into the tank 2 by the spout 7 or in any other suitable manner. Suitable means are provided for mixing the pulp with this solution. For this purpose I show the air lift 8 comprising a vertical tube located centrally of the tank 2 into which air bubbles are discharged through the pipe 9. This air lift suitably agitates the pulp with the second liquid and the mixture can be withdrawn through the pipe 10. Though I consider it preferable to arrange the tanks concentrically one within the other, they might be arranged side by side as shown in Fig. 2 in which a tank 11 is divided into two chambers by means of a vertical partition 12 which stops short of the bottom leaving an opening 13 through which pulp may pass from one chamber to the other. Each half of the chamber may be formed with an inclined bottom as shown. In other respects the arrangement will be the same as in Fig. 1.

An elaborated construction is shown in Figs. 3 and 4. In this form the tank 1 is shown with a flat bottom and the tank 2 is concentrically supported therein so as to rotate. For this purpose I show the tank 1 as formed with a skeleton top 14 supporting an annular track 15 carrying the rollers 16 on which runs the annular track 17 secured to the tank 2. The tank 2 has the bevel gear 18 secured thereto into which meshes the bevel pinion 19 secured to the shaft 20 journaled in suitable bearings supported on the top 14. By rotating the shaft 20 the tank 2 may be rotated as desired. To the lower end of the tank 2 are pivotally connected the scraper arms 21 to which are secured the inclined scrapers 22. As the center tank 2 is rotated these arms gradually feed the pulp to and through the annular opening 6 to the bottom of the tank 2. The inner scraper blades preferably extend right into the opening to insure the feeding of the pulp through the opening, though of course other arrangements may be provided for this purpose. The scraper arms may be raised or lowered to secure any desired rate of feed by means of cables 23 secured to the ends of the arms 21 and passing around the guide pulleys 24. Instead of an air lift I show the inner tank as provided with the screw propeller 25 secured to the lower end of the vertically journaled shaft 26 provided with the pulley 27 by means of which it may be driven. The presence of the screw propeller prevents the mixed pulp and solution from the inner tank from being withdrawn by gravity as in the construction shown in Figs. 1 and 2. I therefore provide a pump 28, the suction pipe 29 of which is led down within the tank 2.

The other features of the apparatus disclosed in Figs. 3 and 4 are the same as those of the apparatus shown in Figs. 1 and 2, save that the launder 3 is preferably arranged within the tank as shown instead of outside.

I find that by suitably regulating the flow of pulp and solution to and from the tanks that a condition approaching equilibrium between the static head of the mixture in the tank 1 and the mixture in the tank 2 may be established so that the pulp separates so effectively from the solution in the tank 1 that a very small quantity only of the solution from the tank 1 will find its way into the tank 2.

The proportion of solution passing to the second tank I find to be very much less than in any system using separate settling and mixing tanks, the pulp being drawn with a proportion of solution from the settling tank and led into the mixing tank. The process is also much more effective than any process attempting to settle and mix in the same tank.

What I claim as my invention is:

1. Leaching apparatus comprising two tanks of approximately the same effective height and elevation communicating with one another at their lower ends by means of an opening of large area, means for supplying a mixture of a liquid and a pulped solid to one tank; means for feeding the pulp through the opening; means for supplying a liquid to the second tank; means for agitating the pulp with the second liquid; and means for removing the mixture of the pulp and second liquid from the second tank.

2. Leaching apparatus comprising two concentric tanks located one within the other and communicating with one another at their lower ends by means of an annular opening of large area, means for supplying a mixture of a liquid and a pulped solid to one tank; means for feeding the pulp through the opening comprising a rotary scraper adapted to scrape toward the opening; means for supplying a liquid to the second tank; means for agitating the pulp with the second liquid comprising a rotary propeller located at the bottom of the tank; and means for removing the mixture of the pulp and second liquid from the second tank.

3. Leaching apparatus comprising two concentric tanks located one within the other and communicating with one another at their lower ends by means of an annular opening of large area, means for supplying a mixture of a liquid and a pulped solid to one tank, means for feeding the pulp through the opening comprising a rotary scraper adapted to scrape toward the opening, means for vertically adjusting the scraper, means for supplying a liquid to the second tank, means for agitating the pulp with the second liquid comprising a rotary propeller located at the bottom of the tank, and means for removing the mixture of the pulp and second liquid from the second tank.

Timmins, this eleventh day of August A. D. 1914.

PERCY A. ROBBINS.

In the presence of—
A. P. GLOBE,
W. E. McCOY.